United States Patent [19]

Samanta

[11] 4,446,040
[45] May 1, 1984

[54] STRONG, HEAT STABLE, WATER REPELLENT, EXPANDED PERLITE/ALKALI METAL SILICATE INSULATION MATERIAL

[75] Inventor: Sudarsan C. Samanta, Plymouth Meeting, Pa.

[73] Assignee: General Refractories Company, Bala Cynwyd, Pa.

[21] Appl. No.: 432,355

[22] Filed: Oct. 1, 1982

[51] Int. Cl.$^3$ .......................... C04B 43/00; E04B 1/80
[52] U.S. Cl. ........................ 252/62; 106/81; 106/84; 106/DIG. 2
[58] Field of Search ............ 252/62; 106/81, 84, 106/DIG. 2

[56] References Cited

U.S. PATENT DOCUMENTS

| | | | |
|---|---|---|---|
| 3,203,813 | 8/1965 | Gajardo et al. | 252/62 |
| 3,658,564 | 4/1972 | Gerow et al. | 252/62 |
| 4,288,253 | 9/1981 | Venable | 106/84 |
| 4,336,068 | 6/1982 | Vogel et al. | 106/84 |

*Primary Examiner*—John E. Kittle
*Assistant Examiner*—Robert A. Wax
*Attorney, Agent, or Firm*—Finnegan, Henderson, Farabow, Garrett & Dunner

[57] ABSTRACT

A coherent, rigid, heat stable, low density, low thermal conductivity, strong, impact resistant, water repellant thermal insulation material, having an average maximum linear shrinkage of 2% or less at temperatures up to 1200° F., made from expanded perlite, alkali metal silicate solution, kaolin clay, and organic fiber. Additions of methylcellulose and polydimethyl silicone liquid enhance the insulation material's strength and water repellency characteristics. The material may be cured and dried at a temperature of about 170° or less for a period of about 24 hours or more without humidity control.

30 Claims, 2 Drawing Figures

THERMAL CONDUCTIVITY VS DENSITY OF PIPE/BLOCK INSULATION

EFFECT OF METHYLCELLULOSE ADDITION
ON PERLITE INSULATION STRENGTH

STRONG, HEAT STABLE, WATER REPELLENT, EXPANDED PERLITE/ALKALI METAL SILICATE INSULATION MATERIAL

BACKGROUND OF THE INVENTION

This invention relates to thermal insulation materials which contain expanded perlite and alkali metal silicate as the principal constituents.

The use of expanded perlite bonded with alkali metal silicates for thermal insulation is described in U.S. Pat. Nos. 3,658,564 and 4,288,253. These patents disclose a process for producing water-insensitive bonded perlite structures using fillers having at least 75% by weight of expanded perlite and an aqueous solution (28 to 34% solids) of sodium silicate having a weight ratio of $SiO_2$ to $Na_2O$ of between 3:1 and 4:1 or a potassium silicate solution (24 to 30% solids) having a weight ratio of $SiO_2$ to $K_2O$ of between 2:1 and 2.6:1. In the '564 patent the mixture of expanded perlite and alkali metal silicate is molded by compression and then cured preferably at a temperature of about 275° to 400° F. under controlled humidity conditions (about 50% relative humidity) with the water content of the molded article being maintained at 10% by weight. An extended curing and drying period of at least three days, and preferably seven days, is used to achieve water insensitivity. According to the '253 patent, the compositions of the '564 patent can be improved by use of a temperature of about 180° to 225° F. and a relative humidity of about 30% to 60% for the curing step.

Unfortunately, such prior art expanded perlite/alkali metal silicate insulation material have serious deficiencies and fail to meet some important industrial requirements. The most important criteria of thermal insulation materials are low density, low thermal conductivity, high strength, good impact resistance, low water absorption or good water repellency, and stability to high temperature exposure. To be suitable for use at high temperatures, it is essential that the material be adequately stable at high temperatures without excessive shrinkage, warpage or cracking. An insulation material designed for use up to 1200° F. should have an average maximum linear shrinkage as tested per American Society for Testing Materials (ASTM) standard # C-356 of 2.0% or less at temperatures up to 1200° F. Expanded perlite/alkali metal silicate insulation material made in accordance with the teachings of the '564 and the '253 patents do not meet this standard. For example, a pipe insulation having a composition identical to the only example of the '253 patent showed an excessive linear firing shrinkage of about 9.0% or higher when fired at 1200° F. for 24 hours.

Additionally, the requirement that the expanded perlite/alkali metal silicate insulation material be cured under closely controlled temperature and humidity conditions, as taught by both the '564 and the '253 patent poses problems in the large-scale manufacture of such materials. Moreover, such parameters make commercial production very costly.

SUMMARY OF THE INVENTION

It is therefore a main object of the present invention to provide an improved, economical, expanded perlite/alkali metal silicate insulation material, and a method for producing the same, which overcomes the aforementioned drawbacks.

It is a more specific object of the present invention to provide an expanded perlite/alkali metal silicate insulation material which is low in density, low in thermal conductivity, high in strength, has good impact resistance and low water absorption and has an average maximum linear shrinkage as tested per ASTM C-356 of 2.0% or less at temperatures up to 1200° F.

It is another object of the present invention to provide a method for producing an expanded perlite/alkali metal silicate insulation material wherein the insulation material can be cured at temperatures of about 170° F. or lower and without humidity control.

A further object of the present invention is to provide an expanded perlite/alkali metal silicate insulation material which has a compressive strength of 70 p.s.i. or better and a modulus of rupture of 40 p.s.i. or better.

A still further object of the present invention is to provide an expanded perlite/alkali metal silicate insulation material which has a thermal conductivity of 0.50 or less B.t.u. in./hr.ft.$^2$°F.

An additional object of the present invention is to provide an expanded perlite/alkali metal silicate insulation material which retains its water repellency characteristics up to temperatures of about 900° F.

Additional objects and advantages of the invention will be set forth in part in the description which follows and in part will be obvious from the description, or may be learned by practice of the invention. The objects and advantages of the invention may be realized and attained by means of instrumentalities and combinations particularly pointed out in the appended claims.

To achieve the objects and in accordance with the purpose of the invention, as embodied and broadly described herein, the invention comprises a thermal insulation material having an average maximum linear shrinkage of 2% or less at temperatures up to 1200° F. made by the process of: mixing expanded perlite, alkali metal silicate, water, up to 15 parts by weight of kaolin clay per 100 parts by weight of expanded perlite, and up to 2 parts by weight of an organic fiber per 100 parts by weight of expanded perlite to form a mixture, the alkali metal silicate and water content of the mixture being between 60% and 140% by weight of the expanded perlite content of the mixture; pressing the mixture in a suitable mold to form a molded article; and curing and drying the molded article.

To further achieve the objects of the invention, the invention comprises the improvement in a thermal insulation material made by mixing together expanded perlite and alkali metal silicate solution to form a mixture, pressing the mixture in a suitable mold to form a molded article, and curing and drying the molded article, comprising adding a small amount of methylcellulose to the expanded perlite/alkali metal silicate mixture to enhance the strength properties of the material.

To further achieve the objects of the invention, the invention comprises the improvement in a thermal insulation material made by mixing together expanded perlite and alkali metal silicate solution to form a mixture, pressing the mixture in a suitable mold to form a molded article, and curing and drying the molded article, comprising adding a small amount of polydimethyl silicone liquid to the expanded perlite/alkali metal silicate mixture to enhance the water repellency properties of the material.

To further achieve the objects of the invention, the invention comprises the improvement in the process for making thermal insulation material including the steps of mixing together expanded perlite and alkali metal silicate solution to form a mixture, pressing the mixture in a suitable mold to form a molded article, and curing and drying the molded article, comprising curing and drying the molded article at a temperature of about 170° for about 24 hours without humidity control.

To further achieve the objects of the invention, the invention comprises a coherent, rigid, heat stable, low density, low thermal conductivity, strong, impact resistant, water repellent, thermal insulation material, having an average maximum linear shrinkage of 2% or less at temperatures up to 1200° F., a compressive strength of 70 p.s.i. or better, a modulus of rupture of 40 p.s.i. or better, and retaining its water repellency characteristics up to temperatures of about 900° F., the thermal insulation material being made by the process of mixing about 100 parts by weight of expanded perlite, about 5 parts by weight of kaolin clay, about 0.5 parts by weight of methylcellulose, about 2 parts by weight of synthetic organic fiber, about 70 parts by weight of sodium silicate solution having a solids content of between 37 and 38 percent, about 0.5 parts by weight of polydimethyl silicone liquid, and about 30 parts by weight of water to form a mixture; pressing the mixture in a suitable mold to form a molded article; and curing and drying the molded article at a temperature of about 170° for about 24 hours.

The foregoing and other objects, features, and advantages of the present invention will be made more apparent from the following description of the preferred embodiments.

DESCRIPTION OF THE PREFERRED EMBODIMENTS

Figure 1:
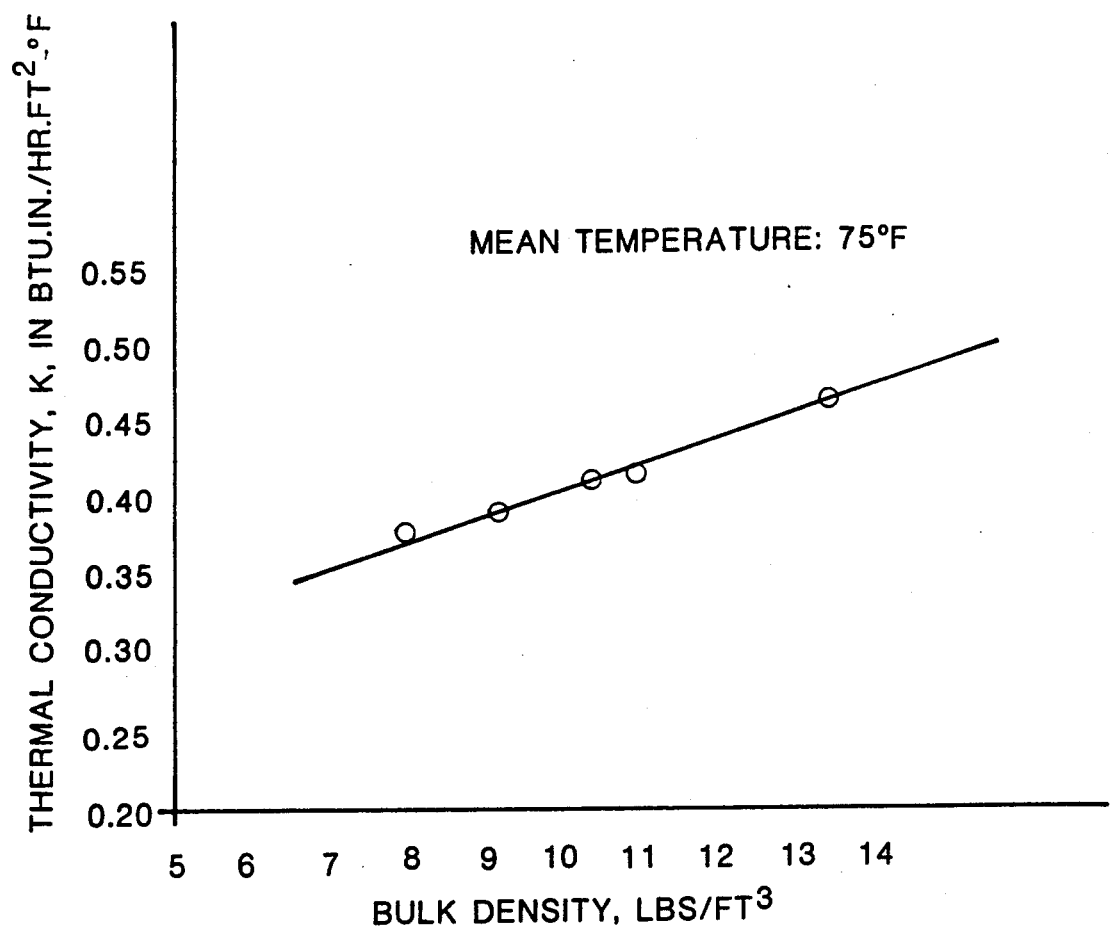
FIG. 1 is a graphic illustration plotting the thermal conductivity versus the bulk density of insulation materials of the present invention.

Reference will now be made in detail to the present preferred embodiments of the invention.

A thermal insulation material having an average maximum linear shrinkage of 2% or less at temperatures up to 1200° F. in accordance with the present invention is made by the process of mixing expanded perlite, alkali metal silicate, water, up to 15 parts by weight of kaolin clay per 100 parts by weight of expanded perlite, and up to 2 parts by weight of an organic fiber per 100 parts by weight of expanded perlite to form a mixture, the alkali metal silicate and water content of the mixture being between 60% and 140% by weight of the expanded perlite content of the mixture, pressing the mixture in a suitable mold to form a molded article; and curing and drying the molded article.

Expanded perlite is a low density material formed by the heating of perlite ore. Processes for producing expanded perlite are generally known in the art. See for example U.S. Pat. Nos. 2,455,666; 2,501,699; and 2,621,160. Expanded perlite is also available commercially. Examples of suitable expanded perlite for purposes of the present invention include "00" grade expanded perlite made by Grefco, Inc. and "PFF 12" grade expanded perlite made by The Pennsylvania Perlite Corporation. Generally, it is desirable for the expanded perlite to have as low a density as possible. For purposes of the present invention, the expanded perlite should have a loose bulk density of between 2.5 and 4.5 lbs./ft.$^3$, preferably 3.0 lbs./ft.$^3$. In addition to contributing to the low density of the resulting insulation material, use of such low density expanded perlite will also contribute to providing the final product with a smooth surface texture. While lower density expanded perlite would also be suitable, because of its prohibitive cost, its use in the present invention would not be commercially practical.

Alkali metal silicate is used as a binder material in the present invention. A number of alkali metal silicates may be used in practicing the present invention, e.g., sodium silicate, potassium silicate, lithium silicate, guanidinium silicate, or quaternary ammonium silicate. However, because of its low cost sodium silicate is preferred. When using sodium silicate, it is desirable to have a weight percent ratio of $SiO_2$ to $Na_2O$ of from about 3:1 to about 4:1. Good results have been obtained using a N grade of sodium silicate solution produced by the PQ Corporation. This grade of sodium silicate solution has a weight percent ratio of $SiO_2$ to $Na_2O$ of 3.22:1 and a solids content of approximately 37-38%.

In practicing the present invention the alkali metal silicate and water content of the mixture should be between 60% and 140% by weight of the expanded perlite content of the mixture. Preferably, the alkali metal silicate and water content of the mixture and the expanded perlite content of the mixture are approximately equal by weight. For example, using a sodium silicate solution having a solids content of approximately 37-38%, good results were obtained by mixing 100 parts by weight of expanded perlite, 70 parts by weight of sodium silicate solution and 30 parts by weight of water. Use of a different alkali metal silicate solution as the binder will of course require some variation in these numbers. It is within the skill of one in this art to determine the precise amounts of expanded perlite, alkali metal silicate solution and water that must be mixed in order to get the desired mixture.

For purposes of the present invention, a small amount of kaolin clay is added to the expanded perlite/alkali metal silicate mixture. Unexpectedly, applicants have discovered that addition of this small amount of kaolin clay provides the resulting insulation material with exceptional heat stability, reducing its average maximum linear shrinkage as tested per ASTM C-356 to 2.0% or less at temperatures of up to 1200° F. Only a small amount, up to 15 parts of kaolin clay per 100 parts of expanded perlite, is desirable since larger amounts of kaolin clay will increase the material's density without any countervailing advantage. Preferably, about 5 parts kaolin clay per 100 parts of expanded perlite should be used.

Kaolin clay is a fine, refractory clay with a high degree of whiteness and plasticity. A typical chemical analysis of such a clay is as follows:

| | |
|---|---|
| $SiO_2$ | 45–55% |
| $Al_2O_3$ | 35–45% |
| $Fe_2O_3$ | up to 0.5% |
| $TiO_2$ | up to 3.5% |
| CaO | up to 0.6% |
| MgO | up to 1.0% |
| $Na_2O$ | up to 0.3% |

| | |
|---|---|
| -continued | |
| loss on ignition (L.O.I.) | 12–14% |

Good results have been obtained using a kaolin clay having the following composition:

| | |
|---|---|
| SiO$_2$ | 46.9% |
| Al$_2$O$_3$ | 38.2% |
| Fe$_2$O$_3$ | 0.35% |
| TiO$_2$ | 1.42% |
| CaO | 0.43% |
| MgO | 0.58% |
| Na$_2$O | 0.04% |
| L.O.I. | 13.9% |

For purposes of the present invention, it is desirable that the amount of Fe$_2$O$_3$ in the clay not exceed 0.5% and the amount of Na$_2$O not exceed 0.3%.

In accordance with the present invention a small amount of an organic fiber material is also added to the expanded perlite/alkali metal silicate mixture. Suitable organic fiber materials include polyester fibers, polypropylene fibers, nylon fibers, rayon fibers or the like. Preferably, the fibers will have diameters ranging between 12 and 25 microns and lengths ranging between 0.25 and 0.75 inches. Such fiber materials are believed to improve the impact-resistance of the final insulation product. It is essential for purposes of the present invention, however, that no more than 2 parts by weight of an organic fiber per 100 parts by weight of expanded perlite be used. If a higher percentage of organic fiber is used it will have a deleterious effect on the heat stability of the insulation material at high temperatures.

It is also desirable to add a small amount of methylcellulose to the expanded perlite/alkali metal silicate mixture. Methylcellulose is a non-ionic, white, free-flowing powder. Methylcellulose is believed to increase the plasticity of the mix, reduce friction during compression and lubricate grain surfaces, thus permitting closer packing, providing additional binding action, and improving the green and dried strength properties of the formed article. Preferably the methylcellulose contains between 27.5% and 31.5% methoxyl (OCH) group. Best results were obtained using about 0.5 parts methylcellulose per 100 parts expanded perlite.

For purposes of the present invention it is also desirable that a small amount of a silicone solution be added to the expanded perlite/alkali metal silicate mixture. Silicone is believed to be surface active and provides effective release, lubricity and water-repellency. Use of a silicone liquid provides the resulting insulation product with water-repellency and low water absorption characteristics. Preferably about 0.5 parts by weight of silicone liquid is used per 100 parts by weight of expanded perlite. Excellent results have been obtained with a concentrated, non-ionic emulsion of a low viscosity polydimethyl silicone fluid. It has been unexpectedly discovered that use of such a polydimethyl silicone liquid results in an insulation material which retains its water-repellency characteristics up to temperatures of about 900° F. This is considerably better than the water-repellent insulation products currently available in the market which tend to lose their water-repellency at temperatures ranging between 610° and 752° F. (321°–400° C.).

In a preferred embodiment of the present invention, 100 parts by weight of expanded perlite, 5 parts by weight of kaolin clay, 0.5 parts by weight of a methylcellulose, 2 parts by weight of a synthetic organic fiber, 70 parts by weight of a sodium silicate solution having a 37–38% solids content, 0.5 parts by weight of a polydimethyl silicone liquid and 30 parts by weight of water are mixed for 2 to 5 minutes in a suitable mixer to achieve a uniform and compactable mix material, in which the fibers appear well distributed. In the laboratory, a Hobart mixer and a V-shell blender, as well as a double-cone type blender work well as mixing equipment for this material. For large-scale commercial production, a double-cone type blender equipped with a high speed agitator is preferred.

After mixing, the mixture is pressed into a suitable mold to form a molded article. The mold may be in any desired shape. Particularly useful shapes for thermal insulation material of this sort are pipe and block shapes.

After the mold is filled and pressed to the desired shape the molded article is cured and dried in a hot air dryer at a temperature of about 170° F. (76.7° C.) or lower for about 24 hours or longer to produce an insulation material. The lower the curing/drying temperature the longer the curing/drying step will take. While temperatures below 140° F. are technically feasible, they are commercially impractical because they would take too much time. Best results are achieved when a temperature of about 170° F. is used. Higher temperatures should be avoided since they can lead to cracking in the finished product unless rigid humidity controls are maintained.

Insulation products made according to the present invention may have a bulk density in the range of 8 to 14 lbs./ft.$^3$ however, a bulk density of 11–13 lbs./ft.$^3$ is preferred. Tests have shown that the materials meet various standard specifications, as required for such insulations (ASTM C-610) and also passes the test for stress-corrosion cracking of stainless steel (DANA test).

The following examples are included to illustrate some specific embodiments and features of this invention. All parts or percentages mentioned are by weight, unless specified otherwise.

EXAMPLE 1

A mix composition containing various raw materials in the following weight proportions: expanded perlite (Grade PFF 12) 100 parts; kaolin clay (SiO$_2$ 46.9%; Al$_2$O$_3$ 38.2%; Fe$_2$O$_3$ 0.35%; TiO$_2$ 1.42%; CaO 0.43%; MgO 0.58%; Na$_2$O 0.04%; L.O.I. 13.%) 5 parts; methylcellulose (27.5%–31.5% methoxyl group) 0.5 parts; nylon fiber (about 12 microns diameter and 0.5" long) 2 parts; sodium silicate solution (Grade N from PQ Corporation) 70 parts; polydimethyl silicone liquid 0.5 parts; and water 30 parts; was mixed for 4 minutes in a Hobart mixer. Requisite amounts of the mix material were then transferred to a pipe insulation mold and were compressed to form a half-pipe section (about 3 feet long, 6 inches o.d., 2 inches i.d.). The pressed pipe section was then cured and dried at 170° F. for 24 hours and tested for various properties according to ASTM test procedures. The pipe insulation material had a bulk density of 11.9 lbs./ft.$^3$, an average compressive strength of about 80 PSI (average of 12 samples) and an average modulus of rupture of about 60 PSI (average of 12 samples). On firing at 1200° F. for 24 hours, the material showed an average linear shrinkage of 1.28% (average of 6 specimens) and a weight loss of 5.58% (average of 6 specimens).

EXAMPLE 2 (COMPARATIVE)

The following Example illustrates the beneficial effect of the addition of kaolin clay on the heat-stability characteristics of the resulting insulation material. In this example, Example 1 was repeated without use of kaolin clay. Table 1 shows the results of testing the resulting insulation material for average linear shrinkage at 1200° F. as compared with those reported in Example 1.

TABLE 1

| Example | Amount of Kaolin Clay Per 100 Parts of Expanded Perlite | Average Linear Shrinkage at 1200° F. |
|---|---|---|
| 1 | 5 parts | 1.28% |
| 2 | 0 parts | 2.72% |

EXAMPLE 3 (COMPARATIVE)

The following Example illustrates the critical nature of the amount of organic synthetic fiber added to the expanded perlite/alkali metal silicate mixture, and how varying the amount effects the heat-stability characteristics of the resulting insulation product. In this example, Example 1 was repeated using different proportions of nylon fiber (1, 2, and 3 parts by weight per 100 parts of expanded perlite were used). The results are reported in Table 2:

TABLE 2

| Amount of Nylon Fiber Per 100 Parts Expanded Perlite | Average Linear Shrinkage at 1200° F. |
|---|---|
| 1 part | 1.75% |
| 2 parts | 1.80% |
| 3 parts | 3.67% |

EXAMPLE 4

Mix compositions as in Example 1 were made and processed. However, the materials were pressed as blocks (approximately 12"×12"×1-2") of varying bulk densities instead of half-pipe form. These insulation blocks were tested in a Dynatech kematic unit for thermal conductivity at a mean temperature of 75° F. Results of thermal conductivity versus bulk density of the insulation material are shown in FIG. 1. As illustrated therein all of the insulation blocks tested had a thermal conductivity of less than 0.50 B.t.u. in./hr. ft.$^2$°F.

EXAMPLE 5

This example illustrates the low water absorption characteristics and superior high-temperature water repellency of an insulation material made with a polydimethyl silicone liquid in accordance with the present invention. The material used for these water absorption and repellency tests is a block insulation (11.4 lbs./ft.$^3$ bulk density), similar to the materials used in Example 1, except that the mix composition contained 2 parts by weight of a polypropylene fiber (about 0.4" long and 22.5 microns in diameter) instead of a nylon fiber. Samples were cut from the block as cubes (about 1.5"×1.5"×1.5") and put in water at room temperature. Four samples were allowed to float, as they normally do, and four others were forcibly immersed by holding them under water with a wire screen. After 24 hours of exposure, the samples were taken out of water, re-weighed and the weight percent water absorption relative to the original weight was calculated for each sample. According to this test, the material showed an average water absorption of 19.2% and 54.7% for floating and forced immersion conditions respectively. Three other samples (about 3.75"×3.75"×1.5") cut from the same insulation block were first fired to 450° C. (842° F.) and soaked one hour. Samples were then taken out of the furnace, cooled to room temperature and tested for water repellency by a sample water drop method. In this test, water drops were allowed to fall on a flat sample surface and observed to determine whether or not water drops were absorbed by the material. Normally, an insulation material made according to this invention, repels water and water drops remain on such a non-wetting material surface. It was observed that the material was still water repellent after 450° C. (842° F.) firing. Then, the same samples were reheated successively to 475° C. (887° F.) and 500° C. (932° F.) and tested likewise. It was found that the material lost its water repellency only after firing to 500° C. (932° F.). Thus, a temperature of more than 887° F. but less than 932° F. may be considered a limit up to which the polydimethyl silicone-treated insulation product of the present invention keeps its water repellent characteristics. This property of the material is unquestionably superior to that of any other material taught by the prior art. Other silicone treated water repellent insulation products, available in the market, tend to lose their water repellency at a temperature in the range of 321°–400° C. (610°–752° F.).

EXAMPLE 6

Figure 2:
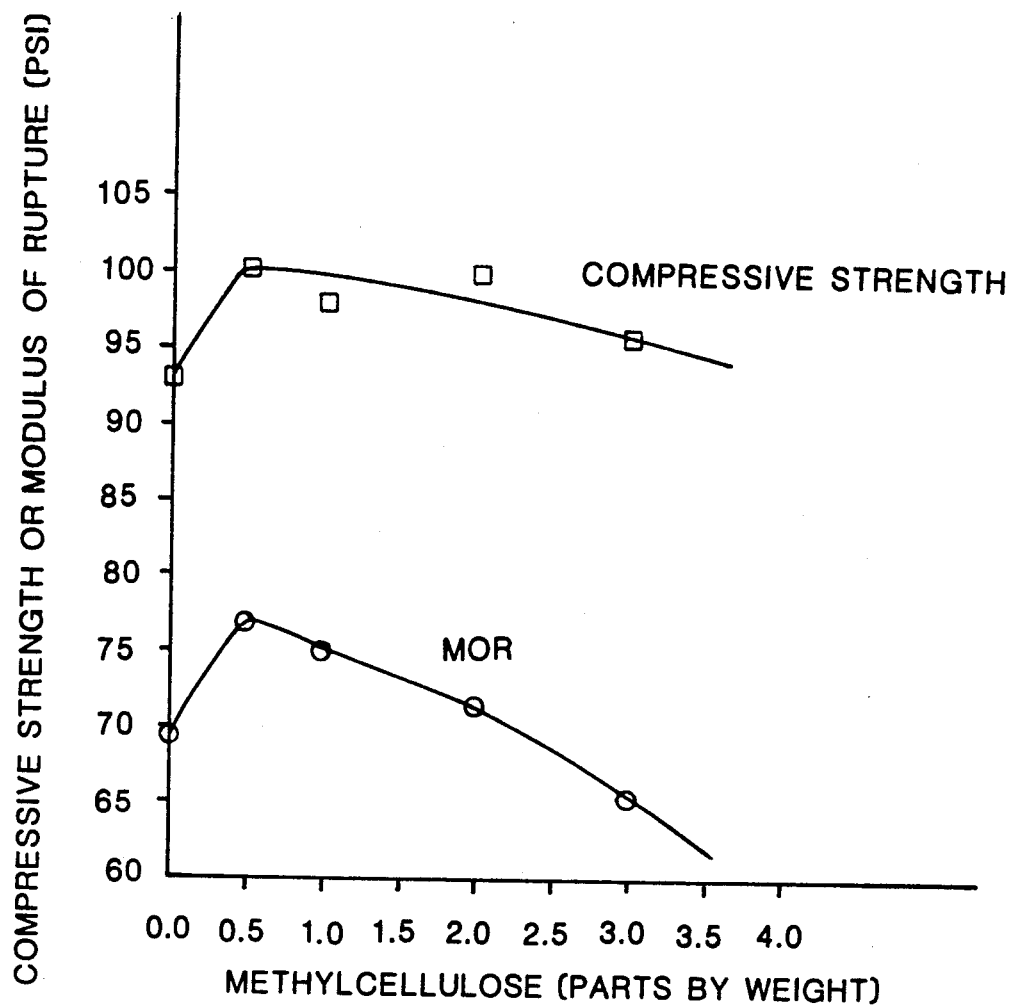
FIG. 2 is a pair of graphic illustrations, one plotting the amount of methycellulose addition versus the modulus of rupture, and the other plotting the amount of methylcellulose addition versus the compressive strength of insulation materials of the present invention.

The following example illustrates the beneficial effect of the 0.5 parts, by weight addition of methylcellulose on the strength properties of a pipe insulation (approximately 12 lbs./ft$^3$) made by the present invention. Mix compositions used were the same as in Example 1 with following exceptions. In these mixes, 2 parts by weight of a polyester (Dacron) fiber (about 0.25" long and 16 microns in diameter) and different proportions of methylcellulose (0.0, 0.5, 1.0, 2.0, and 3.0 parts by weight per 100 parts by weight of expanded perlite) were used. Each composition was mixed in a V-shell blender for 4 minutes and then pressed as half-pipe insulation sections (length, 12", o.d. 5", i.d. 2"). Pressed pipes were then cured/dried at 170° F. for 24 hours and tested for compressive strength and modulus of rupture. It was found that, compared to a material with no methycellulose addition, the best increase in strength properties of the material (about 8 to 11%) was effected by the addition of 0.5 parts methylcellulose. The test results are summarized in a graphical form in FIG. 2.

It will be apparent to those skilled in the art that various modifications and variations can be made in the present invention without departing from the scope or spirit of the invention. Thus it is intended that the present invention cover the modifications and variations of this invention provided that they come within the scope of the appended claims and their equivalents.

What is claimed is:

1. A thermal insulation material having an average maximum linear shrinkage of 2% or less at temperatures up to 1200° F. made by the process of:
    (a) mixing expanded perlite, alkali metal silicate, water, up to 15 parts by weight of kaolin clay per 100 parts by weight of expanded perlite and up to 2 parts by weight of an organic fiber per 100 parts by weight of expanded perlite to form a mixture, the alkali metal silicate and water content of said mixture being between 60% and 140% by weight of the expanded perlite content of said mixture;
(b) pressing said mixture in a suitable mold to form a molded article; and
(c) curing and drying said molded article at a temperature of between about 140° F. and about 170° F.

2. The thermal insulation material of claim 1 wherein said alkali metal silicate and water content of said mixture and said expanded perlite content of said mixture are approximately equal by weight.

3. The thermal insulation material of claim 1 wherein said alkali metal silicate and water content of said mixture comprises about 70 parts by weight of a sodium silicate solution having a solids content of between 37 and 38% and about 30 parts by weight of water per 100 parts by weight of expanded perlite.

4. The thermal insulation material of claim 1 wherein said expanded perlite has a loose bulk density of between 2.5 and 4.5 lbs./ft.$^3$.

5. The thermal insulation material of claim 4 wherein said expanded perlite has a loose bulk density of about 3.0 lbs./ft.$^3$.

6. The thermal insulation material of claim 1 wherein the amount of kaolin clay is about 5 parts by weight per 100 parts by weight of expanded perlite.

7. The thermal insulation material of claim 1 wherein said kaolin clay comprises between 45 and 55% $SiO_2$, between 35 and 45% $Al_2O_3$, up to 0.5% $Fe_2O_3$, up to 3.5% $TiO_2$, up to 0.6% CaO, up to 1.0% MgO, up to 0.3% $Na_2O$, and a loss on ignition of between 12 and 14%.

8. The thermal insulation material of claim 7 wherein said kaolin clay comprises about 46.9% $SiO_2$, about 38.2% $Al_2O_3$, about 0.35% $Fe_2O_3$, about 1.42 $TiO_2$, about 0.43% CaO, about 0.58% MgO, about 0.04% $Na_2O$, and a loss on ignition of about 13.9%.

9. The thermal insulation material of claim 1 wherein said alkali metal silicate is sodium silicate having a weight ratio of $SiO_2$ to $Na_2O$ of from about 3:1 to about 4:1.

10. The thermal insulation material of claim 9 wherein said weight ratio of $SiO_2$ to $Na_2O$ is about 3.22:1.

11. The thermal insulation material of claim 1 wherein said mixture also includes about 0.5 parts by weight methylcellulose per 100 parts by weight of expanded perlite.

12. The thermal insulation material of claim 11 wherein said methylcellulose contains between 27.5 and 31.5% methoxyl group.

13. The thermal insulation material of claim 1 wherein said organic fiber is a synthetic organic fiber selected from the group of polyester fiber, polypropylene fiber, nylon fiber, and rayon fiber.

14. The thermal insulation material of claim 1 wherein said organic fiber has a fiber diameter of between 12 and 25 microns.

15. The thermal insulation material of claim 1 wherein said organic fiber has a length of between 0.5 and 0.75 inches.

16. The thermal insulation material of claim 1 wherein said mixture also includes about 0.5 parts by weight of a silicone liquid per 100 parts of expanded perlite.

17. The thermal insulation material of claim 16 wherein said silicone liquid is a polydimethyl silicone liquid.

18. The thermal insulation material of claim 1 wherein said mixture comprises about 100 parts by weight of expanded perlite, about 5 parts by weight of a kaolin clay, about 0.5 parts by weight of a methylcellulose, about 2 parts by weight of a synthetic organic fiber, about 70 parts by weight of a sodium silicate solution having a solids content of between 37 and 38%, about 0.5 parts by weight of a polydimethyl silicone liquid, and about 30 parts by weight of water.

19. The thermal insulation material of claim 1 wherein the molded article is cured and dried at a temperature of about 170° F.

20. The thermal insulation material of claim 1 wherein said material has a bulk density of between 8 and 14 lbs./ft.$^3$.

21. The thermal insulation material of claim 20 wherein said material has a bulk density of between 11 and 13 lbs./ft.$^3$.

22. The thermal insulation material of claim 20 wherein said material has a thermal conductivity of 0.50 or less B.T.U. in./hr.ft.$^2$°F.

23. In a thermal insulation material made by mixing together expanded perlite and alkali metal silicate solution to form a mixture, pressing said mixture in a suitable mold to form a molded article, and curing and drying said molded article, the improvement comprising adding a small amount of methylcellulose to the expanded perlite/alkali metal silicate mixture to enhance the strength properties of the material.

24. The thermal insulation material of claim 23 wherein the amount of methylcellulose added is about 0.5 parts by weight per 100 parts by weight expanded perlite.

25. The thermal insulation material of claim 23 wherein said methylcellulose contains between 27.5 and 31.5% methoxyl group.

26. In a process for making a thermal insulation material including the steps of mixing together expanded perlite and alkali metal silicate solution to form a mixture, pressing said mixture in a suitable mold to form a molded article, and curing and drying said molded article, the improvement comprising curing and drying said molded article at a temperature of about 170° for about 24 hours without humidity control.

27. A coherent, rigid, heat stable, low density, low thermal conductivity, strong, impact resistant, water repellent, thermal insultion material, having an average maximum linear shrinkage of 2% or less at temperatures up to 1200° F., a compressive strength of 70 p.s.i. or better, a modulus of rupture of 40 p.s.i. or better, and retaining its water repellency characteristics up to temperatures of about 900° F., made by the process of:
(a) mixing about 100 parts by weight of expanded perlite, about 5 parts by weight of kaolin clay, about 0.5 parts by weight of methylcellulose, about 2 parts by weight of synthetic organic fiber, about 70 parts by weight of sodium silicate solution having a solids content of between 37 and 38%, about 0.5 parts by weight of polydimethyl silicone liquid and about 30 parts by weight of water to form a mixture;
(b) pressing said mixture in a suitable mold to form a molded article; and
(c) curing and drying said molded article at a temperature of about 170° for about 24 hours.

28. A thermal insulation material having an average maximum linear shrinkage of 2% or less at temperatures up to 1200° F. made by the process of:

(a) mixing expanded perlite, alkali metal silicate, water, up to 15 parts by weight of kaolin clay per 100 parts by weight of expanded perlite up to 2 parts by weight of an organic fiber per 100 parts by weight of expanded perlite and about 0.5 parts by weight methylcellulose to form a mixture, the alkali metal silicate and water content of said mixture being between 60% and 140% by weight of the expanded perlite content of said mixture;

(b) pressing said mixture in a suitable mold to form a molded article; and (c) curing and drying said molded article.

29. The thermal insulation material of claim 28 wherein said methylcellulose contains between 27.5 and 31.5% methoxyl group.

30. The thermal insulation material of claim 28 wherein said mixture comprises about 100 parts by weight of expanded perlite, about 5 parts by weight of kaolin clay, about 0.5 parts by weight of a methylcellulose, about 2 parts by weight of a synthetic organic fiber, about 70 parts by weight of a sodium silicate solution having a solids content of between 37 and 38%, about 0.5 parts by weight of a polydimethyl silicone liquid, and about 30 parts by weight of water.

* * * * *